(12) United States Patent
Reynolds

(10) Patent No.: US 11,536,945 B2
(45) Date of Patent: Dec. 27, 2022

(54) WEARABLE, ADJUSTABLE, HANDS-FREE BINOCULAR DEVICE

(71) Applicant: Brian Reynolds, Torrance, CA (US)

(72) Inventor: Brian Reynolds, Torrance, CA (US)

( * ) Notice: Subject to any disclaimer, the term of this patent is extended or adjusted under 35 U.S.C. 154(b) by 135 days.

(21) Appl. No.: 17/132,536

(22) Filed: Dec. 23, 2020

(65) Prior Publication Data

US 2022/0197006 A1 Jun. 23, 2022

(51) Int. Cl.
*G02B 23/18* (2006.01)

(52) U.S. Cl.
CPC .................................. *G02B 23/18* (2013.01)

(58) Field of Classification Search
CPC ... G02B 23/125; G02B 23/18; G02B 27/0176
See application file for complete search history.

(56) References Cited

U.S. PATENT DOCUMENTS

| | | | | |
|---|---|---|---|---|
| 1,605,725 A * | 11/1926 | Herbert, Jr. | .......... | A61B 3/0008 359/815 |
| 2,517,892 A * | 8/1950 | Larrabee | ................ | A42B 3/042 359/409 |
| 4,198,114 A * | 4/1980 | Zapp | .................. | G02B 27/0176 359/376 |
| 4,449,787 A * | 5/1984 | Burbo | ................ | G02B 27/0176 359/410 |
| 4,538,888 A * | 9/1985 | Sigelman | ................ | A61B 3/132 351/205 |
| 4,568,158 A * | 2/1986 | Blaha | .................... | A61B 3/132 351/205 |
| 4,637,699 A * | 1/1987 | Sigelman | ................ | A61B 3/132 351/205 |
| 4,775,217 A * | 10/1988 | Ellis | ........................ | A42B 3/042 359/404 |
| 4,982,278 A * | 1/1991 | Dahl | ...................... | G02B 30/34 348/42 |
| 5,181,139 A * | 1/1993 | Benitez | .................. | A42B 1/247 359/410 |
| 5,446,585 A * | 8/1995 | Morley | .................... | G02B 7/12 359/417 |
| 5,467,479 A * | 11/1995 | Mattes | ..................... | A42B 3/04 2/6.3 |
| 5,954,642 A * | 9/1999 | Johnson | ............. | G02B 27/0176 600/300 |

(Continued)

FOREIGN PATENT DOCUMENTS

WO WO-2010062887 A2 * 6/2010 ............. G02B 15/14

OTHER PUBLICATIONS

Teetzel, et al., Provisional Specifications and Drawings 61819199, retrieved 2022 (Year: 2013).*

*Primary Examiner* — Christopher Stanford
(74) *Attorney, Agent, or Firm* — Hudak, Shunk & Farine Co. LPA

(57) ABSTRACT

A binocular device that is wearable on the head of the user or wearer and does not require any hands to hold in place. The device has a pair of telescope sections that transmit an image to an eyepiece viewable by a wearer. Each eyepiece can be adjusted laterally to conform to the wearer's interpupillary distance; vertically, preferably vertically in an arc to provide a desired viewing angle; and longitudinally in relation to the wearer's eyes to a desired eye relief; the adjustments providing a custom-fit device.

20 Claims, 7 Drawing Sheets

(56) References Cited

U.S. PATENT DOCUMENTS

| | | | | |
|---|---|---|---|---|
| 6,028,710 | A * | 2/2000 | Jensen | A42B 1/247 |
| | | | | 359/407 |
| 6,462,867 | B2 * | 10/2002 | Choinere | G02B 23/125 |
| | | | | 359/399 |
| 6,957,449 | B2 * | 10/2005 | Prendergast | G02B 23/125 |
| | | | | 2/6.2 |
| 7,219,370 | B1 * | 5/2007 | Teetzel | A42B 3/042 |
| | | | | 2/6.2 |
| 7,729,063 | B2 * | 6/2010 | Willey | G02B 27/0176 |
| | | | | 2/6.2 |
| 8,830,575 | B2 * | 9/2014 | Rivkin | G02B 23/125 |
| | | | | 359/415 |
| 8,867,128 | B2 * | 10/2014 | Rivkin | G02B 27/0176 |
| | | | | 359/415 |
| 9,709,792 | B2 * | 7/2017 | Teetzel | G02B 23/18 |
| 9,767,613 | B1 | 9/2017 | Bedikian et al. | |
| 9,880,448 | B2 * | 1/2018 | Kovacs | H04N 5/2258 |
| 10,895,760 | B2 * | 1/2021 | Reynolds | G02C 7/088 |
| 2003/0169494 | A1 * | 9/2003 | Porter | G02B 27/025 |
| | | | | 351/158 |
| 2008/0263752 | A1 * | 10/2008 | Solinsky | A42B 3/042 |
| | | | | 2/422 |
| 2013/0083391 | A1 * | 4/2013 | Teetzel | G02B 23/18 |
| | | | | 359/409 |
| 2015/0234173 | A1 | 8/2015 | Sakata et al. | |
| 2016/0034032 | A1 | 2/2016 | Jeong | |
| 2016/0357016 | A1 | 12/2016 | Cakmakci et al. | |
| 2017/0168319 | A1 | 6/2017 | Reynolds | |
| 2017/0318235 | A1 | 11/2017 | Schneider et al. | |
| 2020/0371364 | A1 * | 11/2020 | Kamakura | G02B 27/0172 |
| 2022/0035171 | A1 * | 2/2022 | Yamamoto | G09G 5/00 |

\* cited by examiner

WEARABLE, ADJUSTABLE, HANDS-FREE BINOCULAR DEVICE

FIELD OF THE INVENTION

The present invention relates to a binocular device that is wearable on the head of the user or wearer and does not require any hands to hold in place. The device has a pair of telescope sections that transmit an image to an eyepiece viewable by a wearer. Each eyepiece can be adjusted laterally to conform to the wearer's interpupillary distance; vertically, preferably vertically along an arc to provide a desired viewing angle; and longitudinally in relation to the wearer's eyes to a desired eye relief; the adjustments providing a custom-fit device.

BACKGROUND OF THE INVENTION

Binoculars are commonly used in many different jobs and pastimes to see far away objects more clearly. Many different styles of binoculars have been proposed in the prior art, both hands-free and hand-held.

U.S. Publication No. 2017/0168319 discloses a hands-free binocular device. A pair of eyeglasses has two temples. A telescopic section is mounted to each eyeglass temple. The hands-free binocular device includes lenses for magnifying images and light path redirecting devices for controlling the light path to the eyeglass lenses. Light from an image being observed flows through the magnifying lenses and is redirected by the light path redirecting device. The image is magnified and viewable by a user. The user can shift his gaze upward to view the magnified image or look down from the magnified image to view a non-magnified image. In one preferred embodiment the light path redirecting devices are prisms. In another preferred embodiment the light path redirecting devices are mirrors.

SUMMARY OF THE INVENTION

In view of the above, the art still needs a wearable, hands-free binocular device able to be custom fit to the wearer. Such a device is described herein.

In addition, the device can be used in applications including virtual reality, monoculars, personal video displays and FPV drone goggles.

The device of the invention includes an adjustable frame adapted to be fitted to a wearer's head and generally includes a front section operatively connected to two side sections. The device is custom-fit to the wearer through connection points that are adapted to contact the side of the wearer's head, generally in the temple area, part of the forehead as well as the rear of the wearer's head.

The device includes a telescope section that transmits an image to an eyepiece viewable by the wearer. Two such assemblies are present, one for each eye.

The device includes components that allow adjustment of the eyepieces laterally, generally side to side to adjust interpupillary distance (IPD) of wearer/viewer, as well as vertically preferably in a circular arc/arc like manner vertically in order to comfortably be utilized by the wearer, to maximize viewing image angle. In addition, the telescope section is adjustable in the longitudinal direction in relation to a lateral adjustment support to position the eyepiece at a desired longitudinal distance from the wearer's eye for comfortable eye relief. Furthermore, each eyepiece 114 is able to be rotated independently to adjust the viewing angle.

In one aspect an adjustable, hands-free binocular device is disclosed, comprising a frame adapted to be fitted to a wearer's head and including a front section operatively connected to two side sections, wherein each side section includes a lateral adjustment support to which a telescope section is connected, wherein the wearer adjusts a lateral position of the telescope sections by manipulating a length adjustable fitting having a frame side section operatively connected to the frame side section and telescope fitting laterally moveable in relation to the frame section, wherein the telescope section is adjustable in a longitudinal direction in relation to the lateral adjustment support to move and position an eyepiece of the telescope section at a desired longitudinal distance from the wearer's eye, and, wherein the frame front section has an eyepiece vertical adjustment lever or gear that moves a vertical position of the eyepiece up or down when activated by the wearer.

In a further aspect, the telescope section includes gear teeth mounted in a longitudinal direction of the device, and wherein the gear teeth mesh with a geared wheel of the lateral adjustment support whereby the telescope section is movable longitudinally in relation to the lateral adjustment support.

In an additional aspect, the telescope fitting is slidable in relation to the frame section of the lateral adjustment support.

In still another aspect, an objective lens of the telescope section is located at a vertical height above the eyepiece.

In a further aspect, the telescope section transfers an image incident on the objective lens to the eyepiece optically or digitally.

In an additional aspect, the device side sections are each operatively connected to a temporal bone support piece adapted to contact a temple of the wearer, wherein the temporal bone support piece is spring biased to press inward against a side of the wearer's face.

In still another aspect, each side section includes a rear sliding arm having a rear support pad connected thereto, wherein the rear support pad is adapted to contact a rear of the wearer's head to aid in supporting the device on the wearer.

In a further aspect, the rear sliding arm operatively connected to a spring-loaded ratcheting receiving piece such that the rear support pad is held biased towards the front section of the device.

In an additional aspect, a rear pad release is present and is able to disengage the spring-loaded ratcheting receiving piece to allow the rear support pad to be moved backwards.

In still another aspect, the telescope section is connected to the lateral adjustment support through a bracket, wherein the bracket is rotatable around a horizontal axis whereby the eyepiece vertical position is adjusted.

In a further aspect, the frame includes a pivot gear operatively connected to the bracket and rotation of the pivot gear causes simultaneous rotation of the bracket around the horizontal axis, which in turn moves the eyepieces in an vertical direction in an arc-like manner.

In an additional aspect, a virtual reality module is connected to the telescope section.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
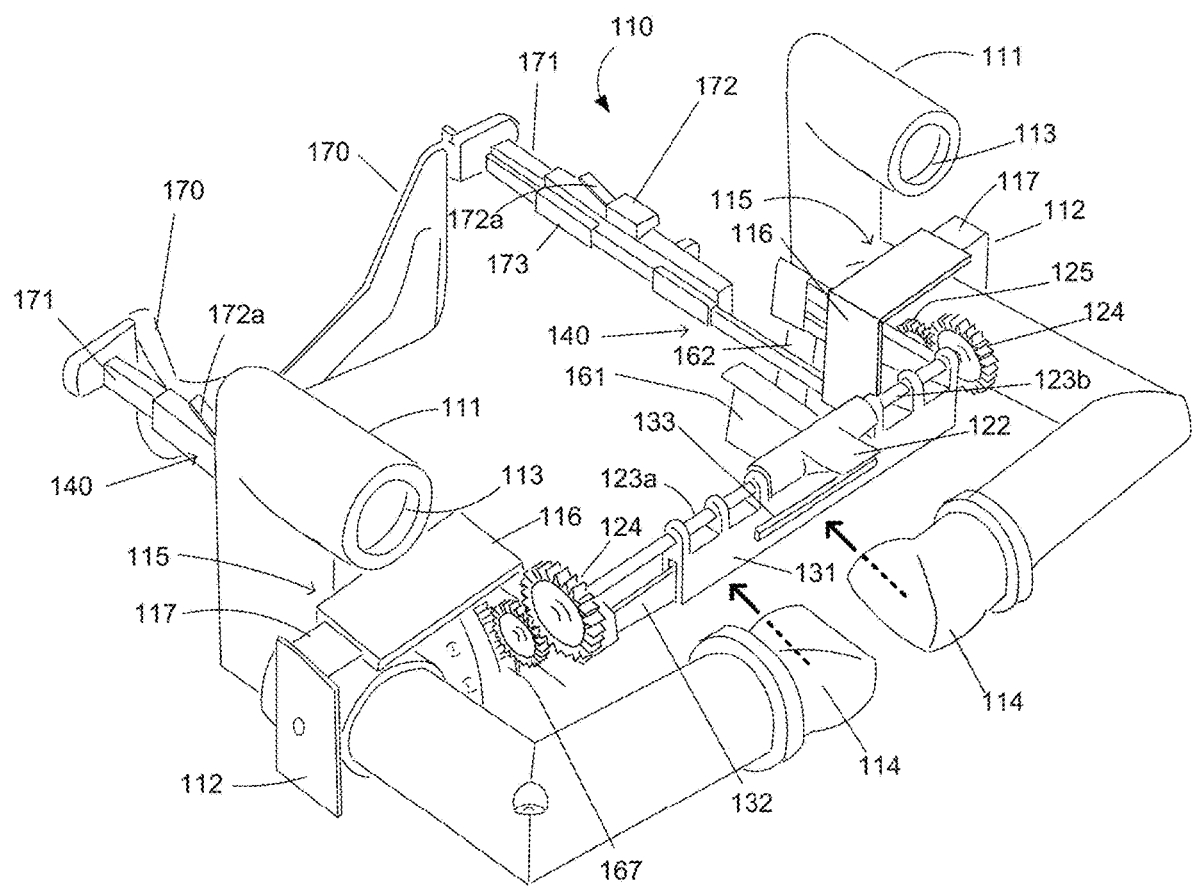
FIG. 1 illustrates a perspective view of one embodiment of a wearable, adjustable, hands-free binocular device of the present invention.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to the drawings, FIG. 1 shows an adjustable, hands-free binocular device 110 having a pair of telescope sections 111 that transmit an image to an eyepiece 114. Construction of device 110 allows each eyepiece to be adjusted laterally, that is, side to side; vertically, which herein includes both up and down and up and down arc-like movements; and longitudinally, towards and away from the wearer's eyes.

Laterally Adjustable Telescope Sections for IPD

Telescope sections 111 are mounted onto device 110 at lateral adjustment support sections 115. Light travels through each telescope section 111 beginning at objective lens 113 and is magnified by lenses and redirected by prisms or mirrors so that the images are viewable by the user's eyes, as indicated by the arrows in FIG. 1. The user may then look at the magnified images through eyepieces 114 or shift his gaze elsewhere to view a normal non-magnified image. In an alternative embodiment, the telescope sections 111 are a digital device that relays an image to eyepiece 114.

In one embodiment, telescope section 111 is connected to lateral adjustment support sections 115 at telescope fitting 112 through operative connection to bracket 116. Lateral adjustment sections 115 are slidably mounted to device 110 see FIG. 7. Using length adjustable fitting 117, telescope fitting 112 slides into frame section 116 and is held in place by friction force and/or locking wheel. Hence, the user or wearer may adjust the lateral position of each telescope section 111 by sliding telescope fitting 112 closer to and further away from the user's head. A proper lateral position of telescope section 111 helps ensure that eyepiece 114 is properly positioned in front of the user's eye.

Figure 6:
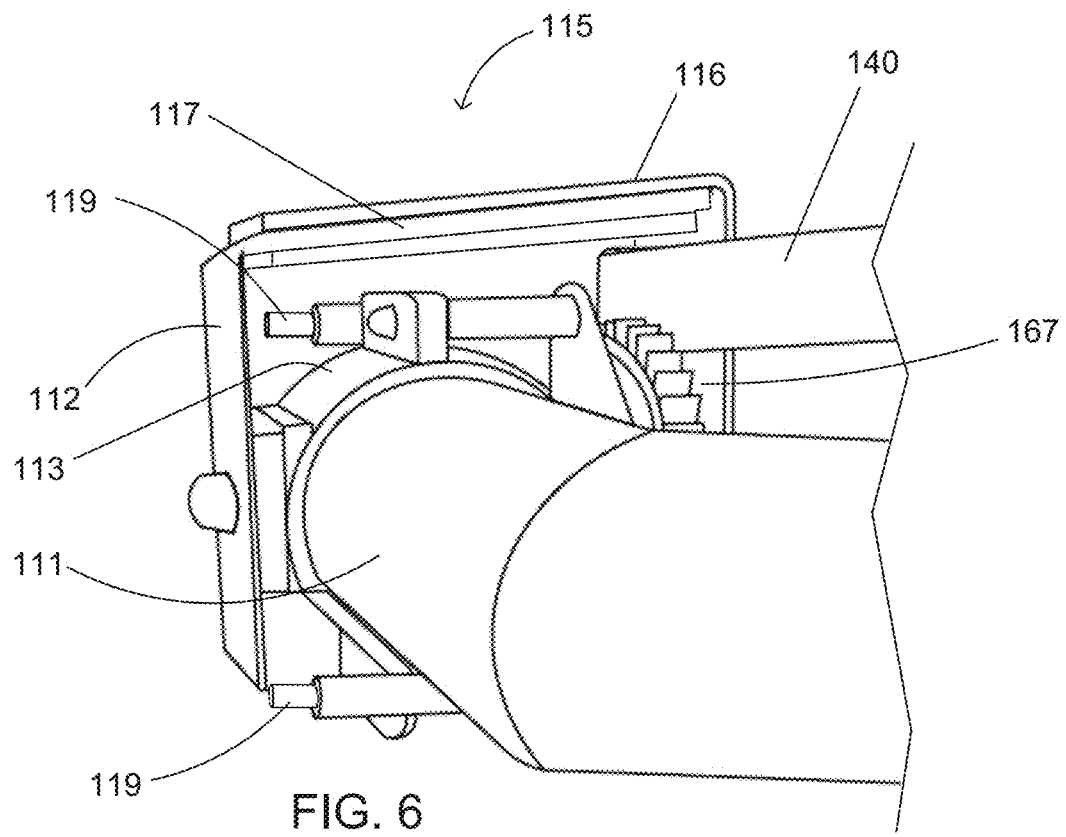
FIG. 6 and FIG. 7 are rear views that particularly illustrate lateral adjustment of the telescope section, wherein in FIG. 6 the telescope section is adjusted inwardly as compared to the view shown in FIG. 7.
Figure 7:
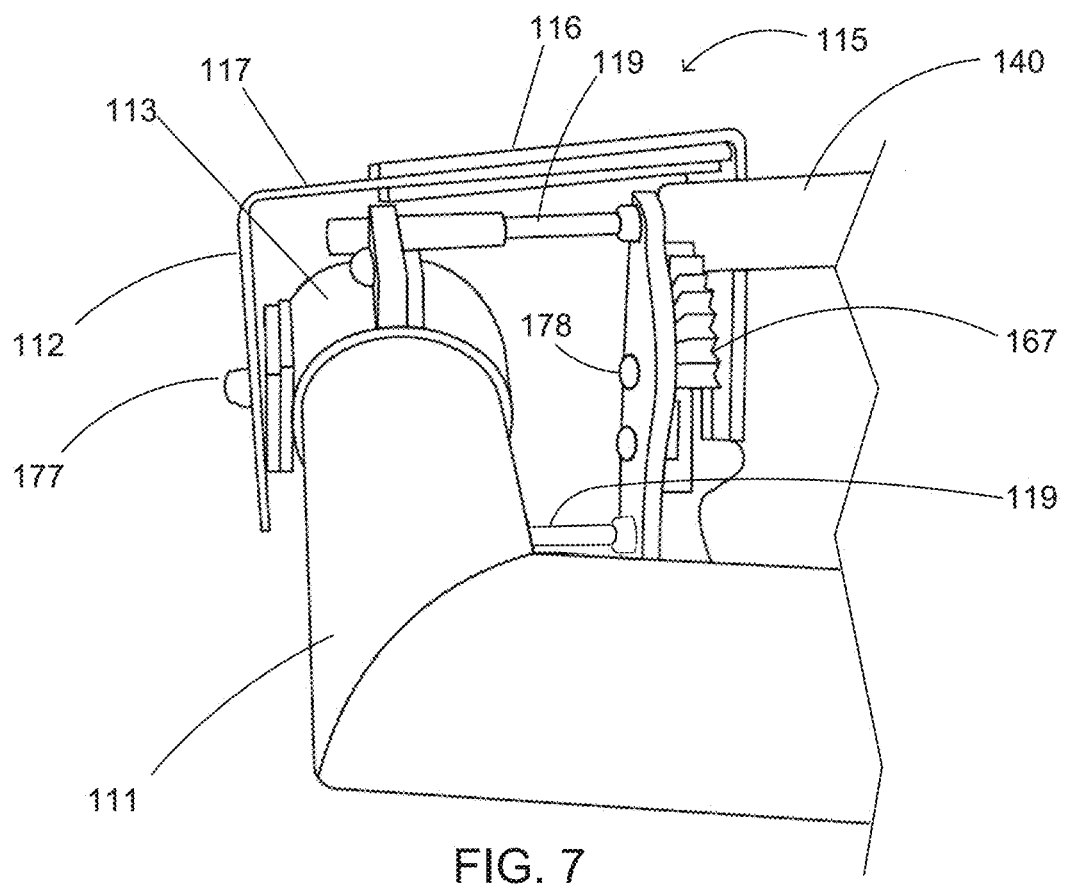

FIGS. 6 and 7 also show guide rods 119 of the frame along which tubes of bracket 113 are laterally movable. Guide rods 119 and the bracket tubes contribute to the stability of the device.

Longitudinal Adjustment—Viewing Arc/Angle

Figure 2:
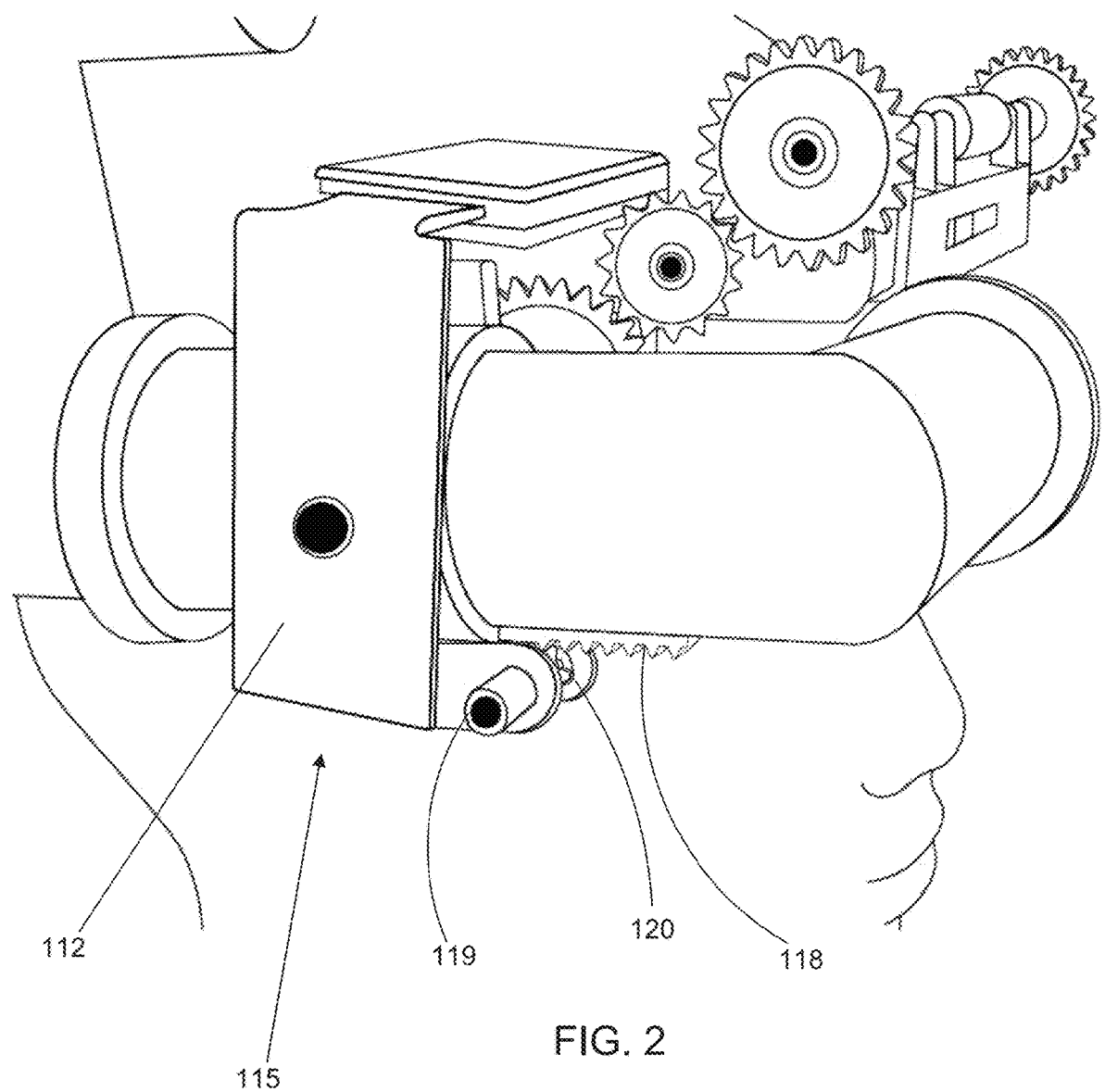
FIG. 2 is a further perspective view particularly illustrating a lateral adjustment support for IPD adjustment to which a telescope section is connected as well as longitudinal, eye relief, adjustment support structure.

Also, in an additional aspect, telescope section 111 includes bottom mounted gear teeth 118. As shown in FIG. 2, gear teeth 118 mesh with geared wheel 120 mounted on a fastener operatively connected to the lateral adjustment support 115. By pulling telescope section 111 further away from his/her face or pushing it closer to his/her face, the user or wearer is able to easily adjust the appropriate eye relief distance of eyepieces 114 to his eyes. As the user pulls or pushes telescope section 111, geared teeth 118 smoothly rolls over geared wheel 120 for precise longitudinal positioning and eye relief.

Eyepiece Vertical Adjustment

Hands-free binocular device 110 also includes eyepiece vertical adjustment lever 122, see FIG. 1. Eyepiece vertical adjustment lever 122 is slidingly connected to axis 123a and rigidly connected to axis 123b. Pivot axes 123a and 123b are both rigidly connected to first gears 124. First gear 124 meshes with second gear 125. Second gear 125 is pivotally connected to temple 140 of hands-free binocular device 110. Second gear 125 meshes with pivot gear 167.

FIG. 6—A pivot gear 167 is operatively connected to bracket 113. Rotation of pivot gear 167 causes simultaneous rotation of bracket 113 around an axis extending through reference numbers 177 and 178, which in turn moves the eyepieces along an arc in a vertical direction.

A user can easily adjust the vertical position of eyepieces 114 by moving lever 122 up and down. The motion will be transferred through gears 124, 125 and 167 to up and down arc-like motion of eyepieces 114. Eyepieces 114 will move up and down concurrently with one another for optimum user control. In a further alternative aspect, gears 124 themselves are rotated instead of lever 122, whereby the lever 122 would serve as a coupler instead.

Lateral Temple Adjustment

In a further embodiment, device 110 includes the ability to adjust the lateral distance between temples 140. Temple 140 is slidingly connected to base 131 via slider 132, see FIG. 1. After donning device 110, the user can slide temples 140 so that the temples are snug and comfortable and match the width of the user's head. Spring loaded ratchet device 133 holds temples 140 in a constant lateral position, once the user has made the adjustment.

Temporal Bone Support Piece

Figure 3:
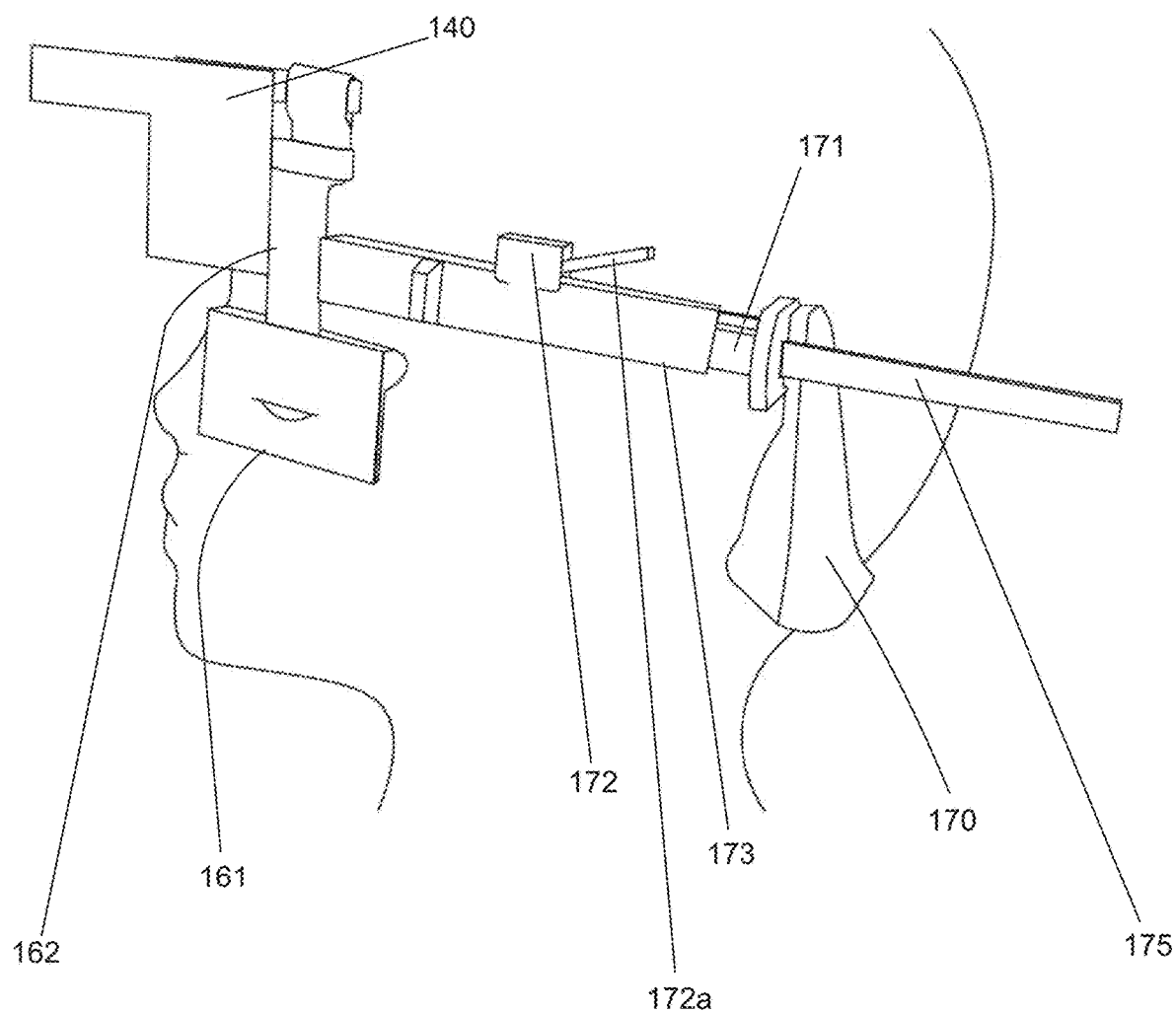
FIG. 3 is side perspective view particularly illustrating connection of the device to a wearer through a temporal bone support piece for the zygomatic process and a rear support pad.
Figure 4:
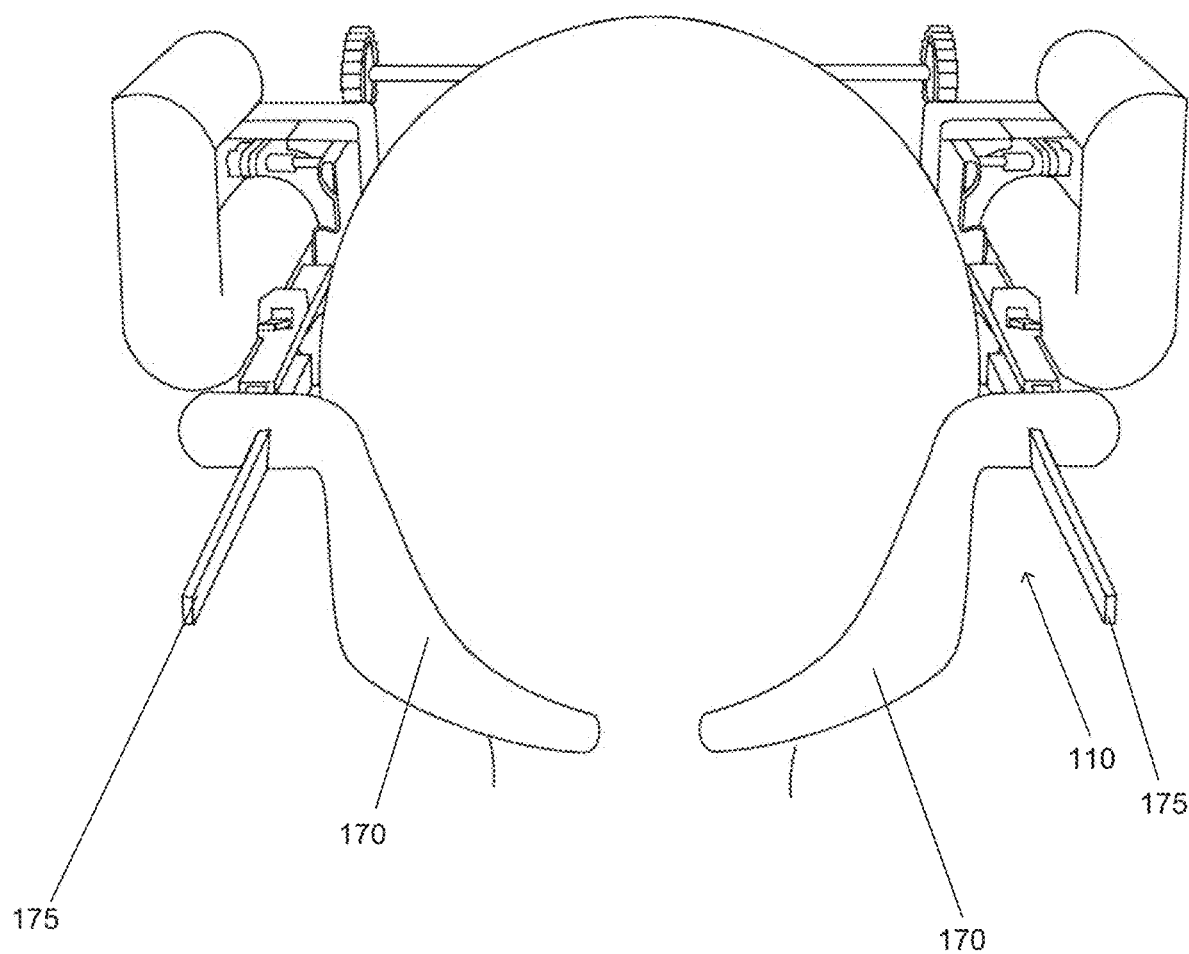
FIG. 4 is a rear view particularly illustrating a rear sliding arm having a rear support pad connected thereto.
Figure 5:
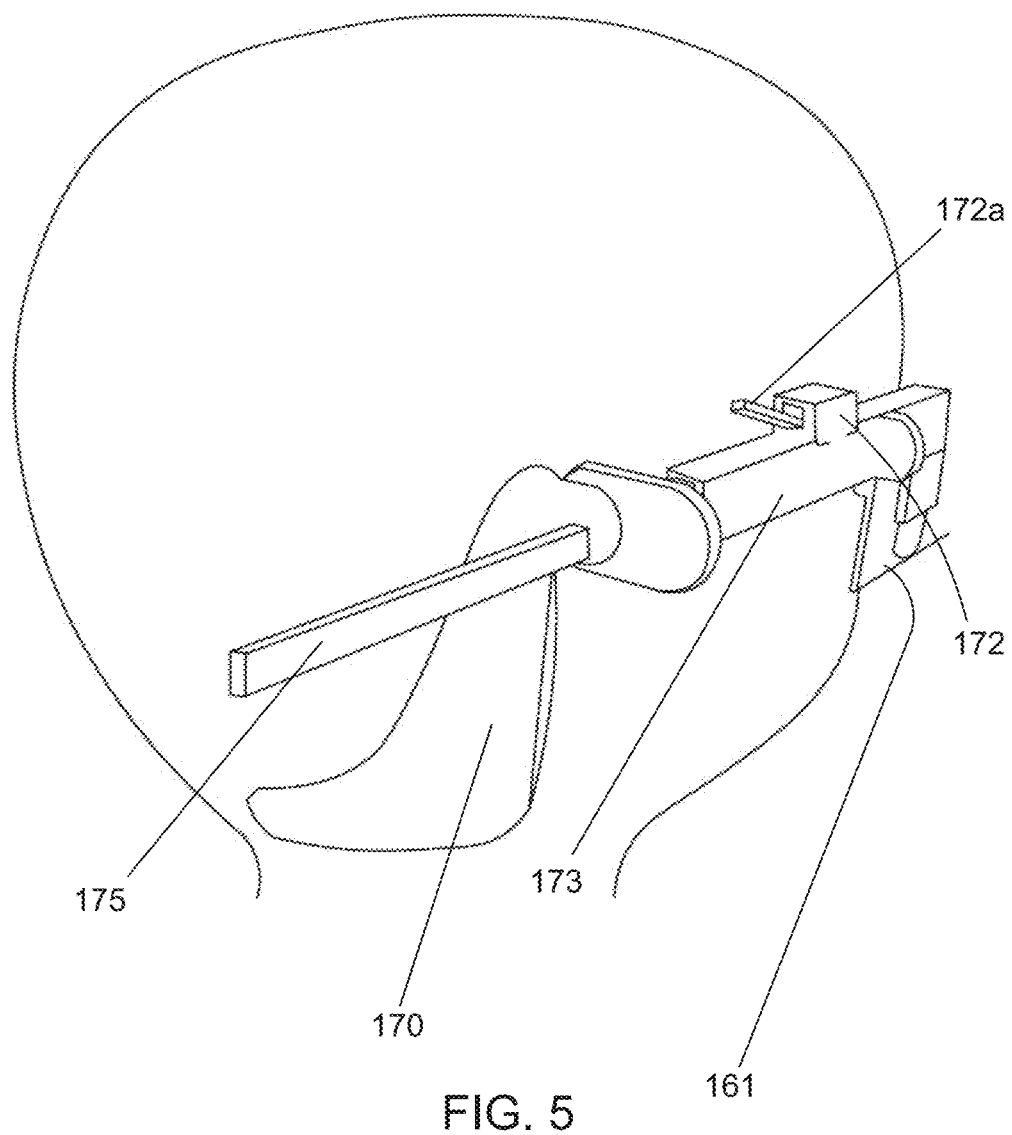
FIG. 5 is a rear perspective view partially showing a side section of the device including the rear support pad as well as the temporal bone support piece in relation to the wearer.

Device 110 includes spring loaded temporal bone support piece 161. Temporal bone support piece 161 is attached to metal spring 162 and is spring biased to press inward against the side of the user's face. Metal spring 162 is connected to temple 140, see FIG. 3. In a preferred embodiment, temporal bone support piece 161 presses against the user's face just above the user's temporal bone. Temporal bone support piece 161 provides the user with greater stability and comfort while wearing and using device 110 and it keeps the device aligned properly to the user's eyes/vision.

Rear Support System

Devices 110 further includes a rear support system for optimum user comfort and stability of hands-free binoculars 110. Contoured rear support pads 170 are rigidly connected to rear sliding arm 171 of a frame side section. Rear sliding arm 171 is inserted inside spring-loaded ratcheting receiving piece 173. After placing hands-free binoculars 110 onto his head, the wearer presses rear support pads 170 towards the rear of his head so that there is a snug supported fit. As rear support pads 170 are moved towards the user's head they ride along rail 175. A spring inside spring-loaded ratcheted receiving piece 173 is biased to resist the compressive motion and the ratchet mechanism prevents rearward movement of sliding arm 171 and rear support pad 170. When the user is done wearing hands-free binoculars 110, the user presses tab 172a of rear pad release 172. This action releases the ratchet connection and the spring within spring-loaded ratcheted receiving piece 173 pushes rear support pad 170 away from the user's head, thereby allowing the user to easily remove hands-free binoculars 110 from his head.

Although the above-preferred embodiments have been described with specificity, persons of ordinary skill in this art will recognize that many changes to the specific embodiments disclosed above could be made without departing from the spirit of the invention. For example, even though FIG. 1 shows telescopic sections 111 mounted above the eyes of the user, it should be recognized that telescopic sections 111 could be also be adjusted to the same level as the wearer's eyes or below the level of the user's eyes. In another preferred embodiment, the wearer can attach his personal eyeglasses to device 110 for personalized usage.

Figure 8:
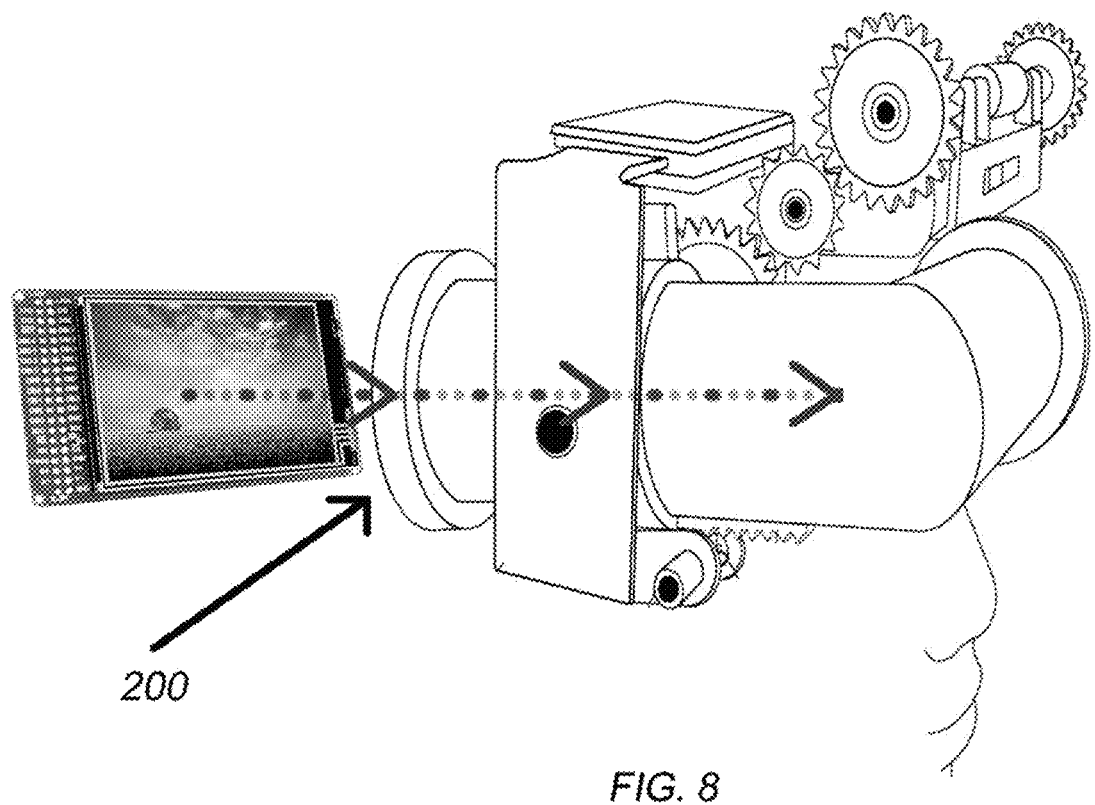
FIG. 8 is a side perspective view showing an embodiment incorporating a virtual reality apparatus.

FIG. 8 illustrates the device including a virtual reality module 200 connected to telescope section 111 that allows use of the device with digital or other electronic content that is not an actual environmental image.

In accordance with the patent statutes, the best mode and preferred embodiment have been set forth; the scope of the invention is not limited thereto, but rather by the scope of the attached claims.

What is claimed is:

1. An adjustable, hands-free binocular device, comprising:
   a frame adapted to be fitted to a wearer's head and including a front section operatively connected to two side sections, wherein the side sections extend rearwardly, with respect to a longitudinal direction of the device, from outer ends of the front section and are adapted to extend adjacent sides of the wearer's head;
   wherein each side section includes a lateral adjustment support to which a telescope section is connected, wherein the wearer adjusts a lateral position of the telescope sections by manipulating a length adjustable fitting having a frame section operatively connected to the frame side section and telescope fitting laterally moveable in relation to the frame side section, wherein the telescope sections each have an objective lens located laterally outward from the side sections;
   wherein the telescope section is adjustable in the longitudinal direction in relation to the lateral adjustment support to move and position an eyepiece of the telescope section at a desired longitudinal distance from the wearer's eye; and
   wherein the frame front section has an eyepiece vertical adjustment lever or gear that moves a vertical position of the eyepiece up or down along an arc when activated by the wearer.

2. The device according to claim 1, wherein the telescope section includes gear teeth mounted in a longitudinal direction of the device, and wherein the gear teeth mesh with a geared wheel of the lateral adjustment support whereby the telescope section is movable longitudinally in relation to the lateral adjustment support.

3. An adjustable, hands-free binocular device, comprising:
   a frame adapted to be fitted to a wearer's head and including a front section operatively connected to two side sections, wherein the side sections extend rearwardly, with respect to a longitudinal direction of the device, from outer ends of the front section and are adapted to extend adjacent sides of the wearer's head;
   wherein each side section includes a lateral adjustment support to which a telescope section is connected, wherein the wearer adjusts a lateral position of the telescope sections by manipulating a length adjustable fitting having a frame section operatively connected to the frame side section and telescope fitting laterally moveable in relation to the frame side section, wherein the telescope sections each have an objective lens located laterally outward from the side sections;
   wherein the telescope section is adjustable in the longitudinal direction in relation to the lateral adjustment support to move and position an eyepiece of the telescope section at a desired longitudinal distance from the wearer's eye;
   wherein the frame front section has an eyepiece vertical adjustment lever or gear that moves a vertical position of the eyepiece up or down along an arc when activated by the wearer,
   wherein the telescope section includes pear teeth mounted in a longitudinal direction of the device, and wherein the gear teeth mesh with a geared wheel of the lateral adjustment support whereby the telescope section is movable longitudinally in relation to the lateral adjustment support; and
   wherein the telescope fitting is slidable in relation to the frame section of the lateral adjustment support.

4. The device according to claim 1, wherein an objective lens of the telescope section is located at a vertical height above the eyepiece.

5. The device according to claim 4, wherein the telescope section transfers an image incident on the objective lens to the eyepiece optically or digitally.

6. The device according to claim 1, wherein the device side sections are each operatively connected to a temporal bone support piece adapted to contact a temple of the wearer, wherein the temporal bone support piece is spring biased to press inward against a side of the wearer's face.

7. The device according to claim 1, wherein each side section includes a rear sliding arm having a rear support pad connected thereto, wherein the rear support pad is adapted to contact a rear of the wearer's head to aid in supporting the device on the wearer.

8. The device according to claim 7, wherein the rear sliding arm operatively connected to a spring-loaded ratcheting receiving piece such that the rear support pad is held biased towards the front section of the device.

9. The device according to claim 8, wherein a rear pad release is present and is able to disengage the spring-loaded ratcheting receiving piece to allow the rear support pad to be moved backwards.

10. The device according to claim 1, wherein the telescope section is connected to the lateral adjustment support through a bracket, wherein the bracket is rotatable around a horizontal axis whereby the eyepiece vertical position is adjusted.

11. The device according to claim 10, wherein the frame includes a pivot gear operatively connected to the bracket and rotation of the pivot gear causes simultaneous rotation of the bracket around the horizontal axis, which in turn moves the eyepieces in a vertical direction along an arc.

12. The device according to claim 1, wherein a virtual reality/video display module is operatively connected to the telescope section.

13. The device according to claim 2, wherein the telescope fitting is slidable in relation to the frame section of the lateral adjustment support, wherein an objective lens of the telescope section is located at a vertical height above the eyepiece, and wherein the telescope section transfers an image incident on the objective lens to the eyepiece optically or digitally.

14. The device according to claim 2, wherein the telescope section is connected to the lateral adjustment support through a bracket, wherein the bracket is rotatable around a horizontal axis whereby the eyepiece vertical position is adjusted.

15. The device according to claim 14, wherein the frame includes a pivot gear operatively connected to the bracket and rotation of the pivot gear causes simultaneous rotation of the bracket around the horizontal axis, which in turn moves the eyepieces in a vertical direction along an arc.

16. The device according to claim 10, wherein the telescope section includes gear teeth mounted in a longitudinal direction of the device, and wherein the gear teeth mesh with a geared wheel of the lateral adjustment support whereby the telescope section is movable longitudinally in relation to the lateral adjustment support, and wherein the telescope fitting is slidable in relation to the frame section of the lateral adjustment support.

17. The device according to claim 16, wherein the frame includes a pivot gear operatively connected to the bracket and rotation of the pivot gear causes simultaneous rotation of the bracket around the horizontal axis, which in turn moves the eyepieces in a vertical direction along an arc.

18. The device according to claim 2, wherein the device side sections are each operatively connected to a temporal bone support piece adapted to contact a temple of the wearer, wherein the temporal bone support piece is spring biased to press inward against a side of the wearer's face, wherein each side section includes a rear sliding arm having a rear support pad connected thereto, and wherein the rear support pad is adapted to contact a rear of the wearer's head to aid in supporting the device on the wearer.

19. The device according to claim 18, wherein the telescope section is connected to the lateral adjustment support through a bracket, wherein the bracket is rotatable around a horizontal axis whereby the eyepiece vertical position is adjusted.

20. The device according to claim 19, wherein the frame includes a pivot gear operatively connected to the bracket and rotation of the pivot gear causes simultaneous rotation of the bracket around the horizontal axis, which in turn moves the eyepieces in a vertical direction along an arc.

* * * * *